US009569114B2

(12) United States Patent
Harijono et al.

(10) Patent No.: US 9,569,114 B2
(45) Date of Patent: Feb. 14, 2017

(54) DEDUPLICATION USING A MASTER AND A SLAVE

(71) Applicant: SK hynix memory solutions inc., San Jose, CA (US)

(72) Inventors: Indra G. Harijono, San Jose, CA (US); Zhenchuan Chai, Milpitas, CA (US)

(73) Assignee: SK hynix memory solutions Inc., San Jose, CA (US)

( * ) Notice: Subject to any disclaimer, the term of this patent is extended or adjusted under 35 U.S.C. 154(b) by 187 days.

(21) Appl. No.: 14/671,711

(22) Filed: Mar. 27, 2015

(65) Prior Publication Data

US 2016/0139817 A1    May 19, 2016

Related U.S. Application Data

(60) Provisional application No. 62/080,015, filed on Nov. 14, 2014.

(51) Int. Cl.
*G06F 13/00* (2006.01)
*G06F 3/06* (2006.01)

(52) U.S. Cl.
CPC .......... *G06F 3/0608* (2013.01); *G06F 3/0641* (2013.01); *G06F 3/0679* (2013.01)

(58) Field of Classification Search
CPC combination set(s) only.
See application file for complete search history.

(56) References Cited

U.S. PATENT DOCUMENTS

| 8,984,060 | B2 | 3/2015 | Li et al. |
| 2010/0235333 | A1 | 9/2010 | Bates et al. |
| 2012/0158672 | A1 | 6/2012 | Oltean et al. |
| 2014/0281361 | A1 | 9/2014 | Park et al. |
| 2015/0066873 | A1 | 3/2015 | Voruganti et al. |

OTHER PUBLICATIONS

Mun-Seok Noh, "Related Art Search Report", SNK Patent Law Office, Nov. 18, 2014.

*Primary Examiner* — Charles Rones
*Assistant Examiner* — Han Doan
(74) *Attorney, Agent, or Firm* — IP & T Group LLP

(57) ABSTRACT

A write instruction includes a logical address and write data to be stored. An address mapping master is used to determine if the logical address is stored in an address table. A deduplication state is selected based at least in part on whether the logical address is stored in the address table and whether a fingerprint is stored in a fingerprint table. The fingerprint is generated using the write data. A fingerprinting slave is used to determine if the fingerprint is stored in the fingerprint table, where the address mapper and the fingerprinter are configured to run in parallel and the address mapper is the master to the fingerprinter's slave.

18 Claims, 13 Drawing Sheets

← 500

Fingerprint Table at $T_1$

| $FP(D_0)$ | | |
|---|---|---|
| $PA_0$ | | |

Address Table at $T_1$

| $PA_0$ | | |
|---|---|---|
| $LA_0$ | | |

← 510

Write Data = $D_0$

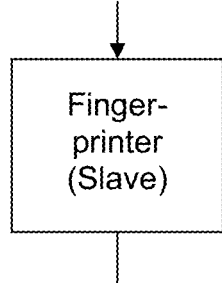

Finger-printer (Slave)

340a
Duplicate Data

Logical Address = $LA_1$

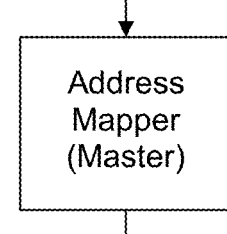

Address Mapper (Master)

Fingerprint is stored in the Fingerprint Table and write data matches stored data Logical Address is not stored in the Address Table

← 520

Fingerprint Table at $T_2$

| $FP(D_0)$ | | |
|---|---|---|
| $PA_0$ | | |

Address Table at $T_2$

| $PA_0$ | $PA_0$ | |
|---|---|---|
| $LA_0$ | $LA_1$ | |

FIG. 5

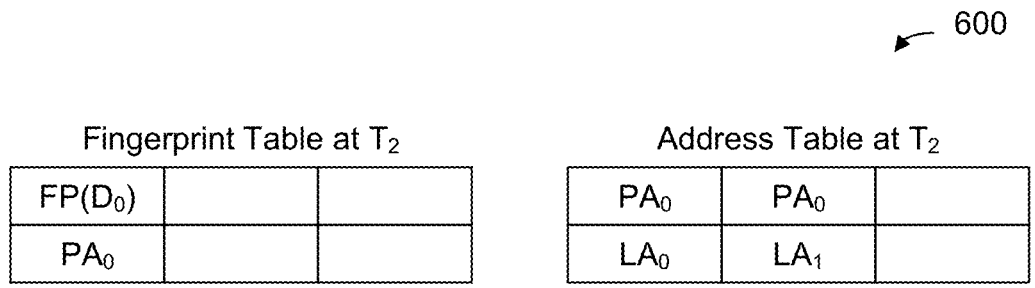
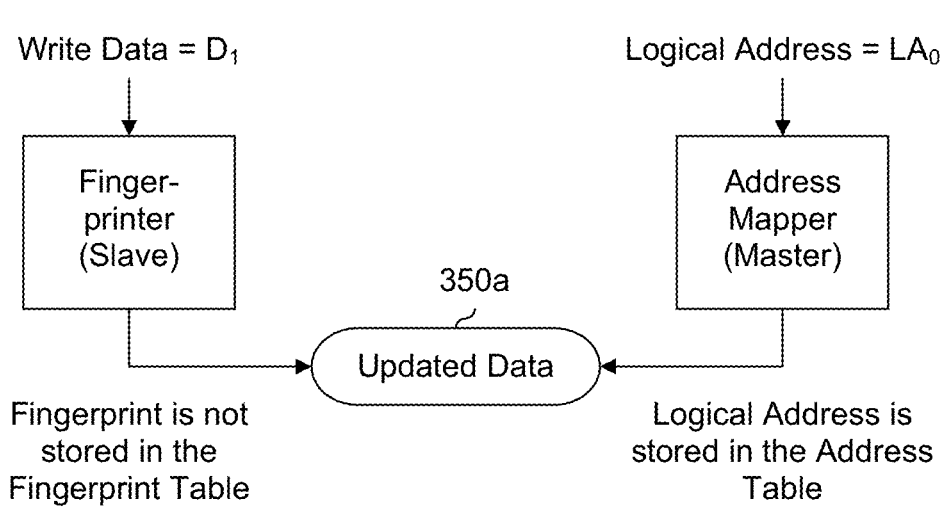
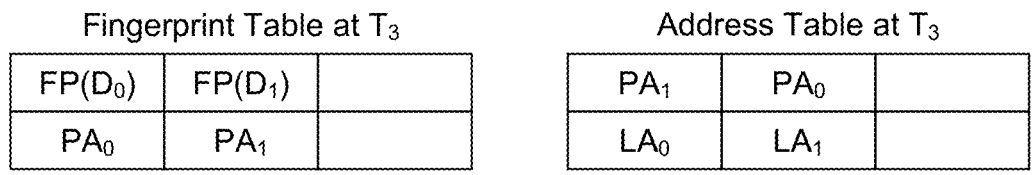
FIG. 6

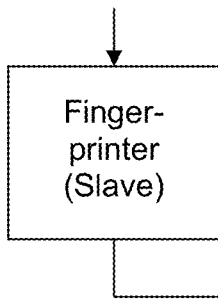
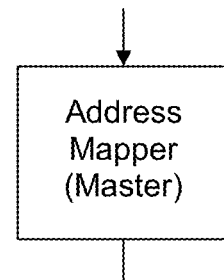
FIG. 7

DEDUPLICATION USING A MASTER AND A SLAVE

CROSS REFERENCE TO OTHER APPLICATIONS

This application claims priority to U.S. Provisional Patent Application No. 62/080,015 entitled METHODS FOR FAST AND HIGH PERFORMANCE BULK PROCESSING IN STORAGE DATA DEDUPLICATION PROCESS filed Nov. 14, 2014 which is incorporated herein by reference for all purposes.

BACKGROUND OF THE INVENTION

Deduplication is a storage technique in which duplicate chunks of data are identified so that only a single actual copy needs to be stored. Instead of storing multiple copies of the same chunk of data, multiple references to a single stored instance of the chunk of data are kept. New techniques which enable faster deduplication would be desirable. It would also be desirable if these new techniques addressed some issues specific to newer types of storage media, such as solid state storage (e.g., Flash).

BRIEF DESCRIPTION OF THE DRAWINGS

Various embodiments of the invention are disclosed in the following detailed description and the accompanying drawings.

FIG. 5 is a diagram illustrating an embodiment of a fingerprint table and an address table updated in response to receiving a second logical address and write data pair.

FIG. 6 is a diagram illustrating an embodiment of a fingerprint table and an address table updated in response to receiving a third logical address and write data pair.

FIG. 7 is a diagram illustrating an embodiment of an updated fingerprint table and address table in response to receiving a fourth logical address and write data pair.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
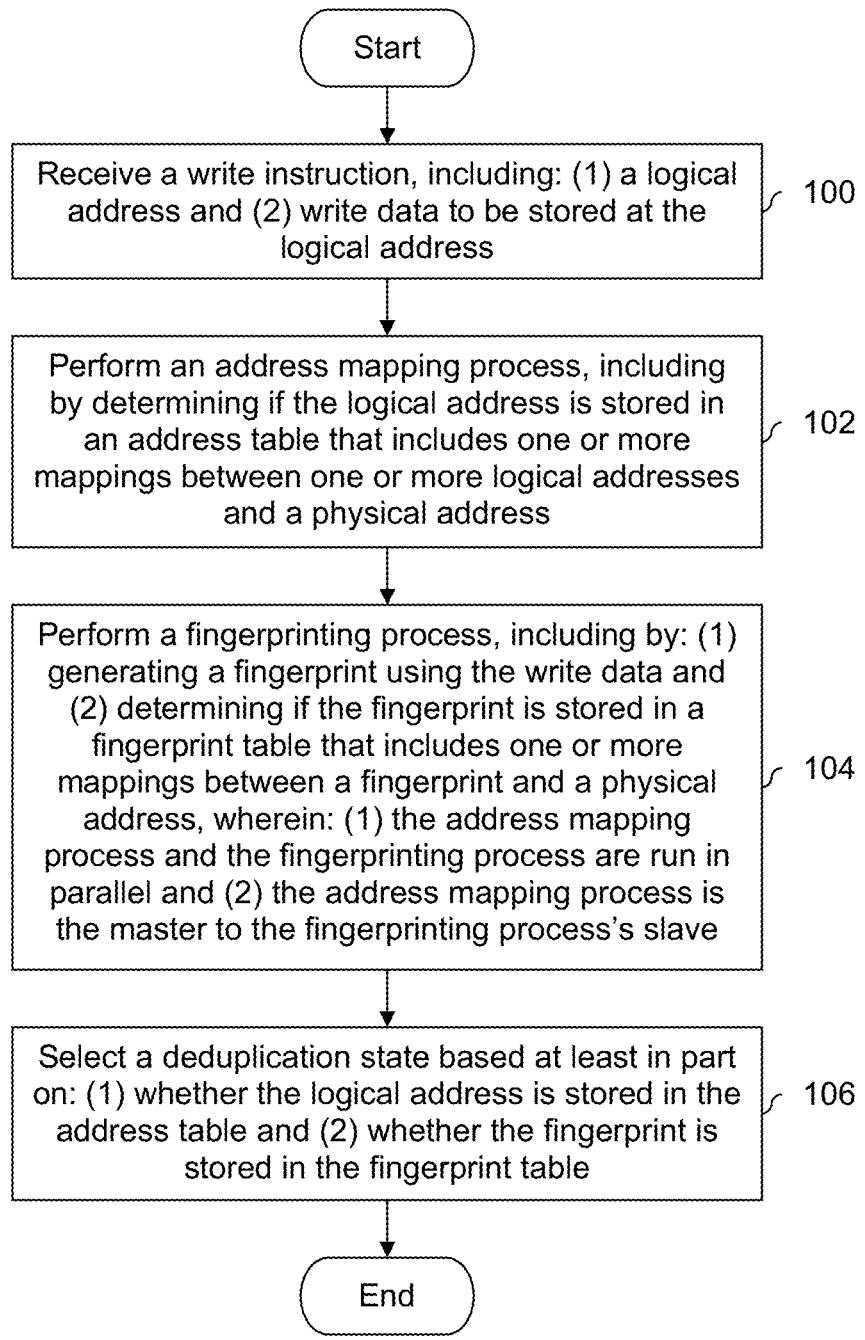
FIG. 1 is a flowchart illustrating an embodiment of a process for performing deduplication storage using a master and a slave.

FIG. 1 is a flowchart illustrating an embodiment of a process for performing deduplication storage using a master and a slave. Data deduplication (hereinafter referred to more simply as deduplication) is a data storage technique in which duplicate copies of data are identified such that (ideally) at most, only a single copy of a unique piece of data is stored. Subsequent copies of the data merely point to the earlier stored copy so that duplicates are not stored. For example, email replies often include the received email which is being responded to. If the received email and the response (which includes a copy of the received email) are both stored on deduplication storage, then the copy of the first email included in the second email would be identified and that portion would refer to the first email in the deduplication storage so that two copies of the same data do not need to be stored. Deduplication is sometimes referred to as single-instance (data) storage.

In addition to improving storage utilization (e.g., because duplicates are eliminated, reducing the total amount of data stored), deduplication can improve performance in a network by reducing the amount of information that must be exchanged over the network. Deduplication also increases the lifespan of a solid state drive because less data need to be written.

At 100, a write instruction is received, including: (1) a logical address and (2) write data to be stored at the logical address. In embodiments described herein, there is a fingerprinting process (component) and an address mapping process (component), which operate together to store data in a manner that avoids redundant or duplicate data (i.e., deduplication). In embodiments described herein, the address mapping process acts as the master and the fingerprinting process acts as the slave; as such, the write instruction is received by the address mapping process. The address mapping process then initiates the fingerprinting process using any appropriate technique. Some examples are described in further detail below.

The actual (i.e., physical) location(s) where the write data is stored on storage (e.g., magnetic storage such as hard disk drive (HDD) storage or solid state storage such as Flash storage) is/are referred to as the physical address(es). In some embodiments, the write data is broken up into multiple chunks and is stored in multiple (e.g., non-contiguous) physical addresses and so the logical address corresponds to multiple physical addresses (in some embodiments). (For simplicity, some embodiments described herein may have a 1-to-1 ratio of logical addresses to physical addresses.) To keep track of which physical addresses correspond to which logical addresses, an address table is used to store the mapping between logical addresses and physical addresses.

In some embodiments, the logical address is associated with a file system or an application (e.g., the logical address is the address by which the file system or application will ask for the data back during a corresponding read operation). In some such embodiments, the address mapping process may reside in or below a device driver (e.g., where the device driver sits below an I/O layer, which in turn sits below a file system, which in turn sits below an application layer).

At 102, an address mapping process is performed, including by determining if the logical address is stored in an address table that includes one or more mappings between one or more logical addresses and a single physical address. For example, in the entire address table, one (unique) logical address is mapped to only one physical address, however one single physical addresses can be mapped, associated, or otherwise referred to by many logical addresses. As will be described in further detail below, the exemplary deduplication process described herein comes to one of three deduplication conclusions or deduplication states: new data, duplicate data, or updated data. In order to decide which is the appropriate deduplication state, the address mapping process determines if the logical address (e.g., received at step 100) is stored in the address table (e.g., whether the logical address received at step 100 has been observed before).

At 104, a fingerprinting process is performed, including by: (1) generating a fingerprint using the write data and (2) determining if the fingerprint is stored in a fingerprint table that includes one or more mappings between a fingerprint and a physical address, wherein: (1) the address mapping process and the fingerprinting process are run in parallel and (2) the address mapping process is the master to the fingerprinting process's slave.

Since the fingerprinting process operates on the fingerprint table and the address mapper operates on the address table, the two processes are able to operate in parallel since they do not need to worry about interference from the other process with respect to their table. It would not be desirable, for example, if the fingerprint process changed information in the address table when the address mapper process was accessing the same information. This would create a race condition and (more importantly) produce inconsistent and occasionally incorrect results.

As will be described in more detail below, the results from the fingerprinting process and the address mapping process are combined together. To ensure that both processes have completed before the results are combined, one of the processes is designated as a master and the other is designated as a slave. Although the fingerprinting process could be designated as the master and the address mapping process could be designated as the slave, in embodiments described herein the address mapping process is the master to the fingerprinting process's slave. This is because the fingerprinting process is more processing intensive than the address mapping process, and it would not be desirable to keep the master tied up. In addition to being a time consuming and resource intensive process, fingerprinting is (at least in some applications) best done by a hardware accelerated engine (for example) because of its straight-forward low level logical processing. The low level logical routine for fingerprinting is strictly based on pure mathematical procedures which makes it perfect for hardware implementation. It is preferable to have the master free to (for example) queue up the slave fingerprinting process with subsequent runs, combine corresponding results, initiate appropriate subsequent deduplication processes based on what the deduplication state is, etc.

In some embodiments, in order to generate a fingerprint using the write data, a (e.g., cryptographic) hash function is used. If two fingerprints do not match, then it can be concluded with 100% certainty that the two pieces of data from which the fingerprints were generated do not match. However, if two fingerprints do match, there is a very small (but non-zero) probability that two different pieces of data resulted in the same fingerprint. This is referred to as a collision.

In some embodiments, data is divided up into chunks (e.g., of constant or variable length) and the chunks are passed to a hash function which generates the fingerprints. It is noted that the deduplication techniques described herein may be used with any chunking technique. For clarity, chunking is not described herein, but any chunking process may be easily integrated into the system (e.g., before the process of FIG. 1).

At 106, a deduplication state is selected based at least in part on: (1) whether the logical address is stored in the address table and (2) whether the fingerprint is stored in the fingerprint table. In some examples described herein, the selected deduplication state may be: new data, duplicate data, or updated data. In some embodiments, step 106 is performed by the master (i.e., the address mapping process) since it is the "brains" of the deduplication system and the fingerprinter is the "brawns" of the deduplication system. More detailed examples of how the appropriate deduplication state is selected are described below.

Figure 2:
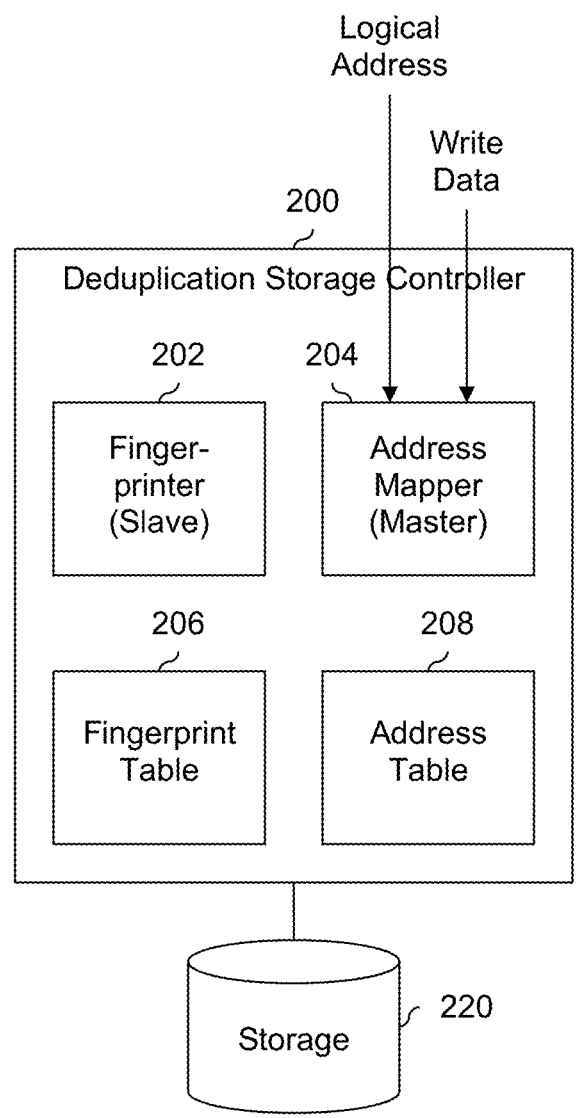
FIG. 2 is a diagram illustrating an embodiment of a master-slave deduplication storage system.

FIG. 2 is a diagram illustrating an embodiment of a master-slave deduplication storage system. Deduplication storage controller 200 shows one example of a system which performs the process of FIG. 1. In this example, deduplication storage controller 200 includes fingerprinter 202, address mapper 204, fingerprint table 206, and address table 208. In some embodiments, at least some part of deduplication storage controller 200 is implemented using a semiconductor device, such as an application-specific integrated circuit (ASIC) or a field-programmable gate array (FPGA). In one example, all of deduplication storage controller 200 is implemented on a semiconductor device. In another example, fingerprinter 202 and fingerprint table 206 are implemented on a semiconductor device (e.g., for the reasons described above, it may be desirable for the slave to be implemented in hardware) and address mapper 204 and address table 208 are implemented in firmware.

As the master, address mapper 204 receives the logical address and the write data. Address mapper 204 then initiates processing by the slave, fingerprinter 202. In some embodiments, address mapper 204 initiates processing by the slave first before starting its own address mapping processing (i.e., determining the logical address is stored in address table 208). Since address mapper 204 and fingerprinter 202 are designed to operate in parallel, it would not be desirable to wait for address mapping to be completed before initiating fingerprinting.

In some embodiments, there is a write data queue (not shown) that sits between address mapper 204 and fingerprinter 202 in which address mapper 204 deposits write data. Such a queue between address mapper 204 and fingerprinter 202 would enable address mapper 204 to queue up work even when fingerprinter 202 is busy with earlier write data. Such a queue would also enable address mapper 204 to adjust the ordering of write data in order to prioritize certain write data over other write data based on some criteria.

Fingerprinter 202 generates a fingerprint from the write data received from address mapper 204 (e.g., via a write data queue or any other interface). Fingerprinter 202 then determines if the fingerprint is stored in fingerprint table 206 and informs address mapper 204 of its result(s). In some embodiments where there is a write data queue (not shown) residing between fingerprinter 202 and address mapper 204, fingerprinter 202 writes its results to the appropriate entry in the write data queue.

While fingerprinter 202 is doing its fingerprinting processing, address mapper 204 determines if the logical address is stored in address table 208. Fingerprint table 206 and address table 208 are updated as needed by fingerprinter 202 and address mapper 204, respectively. Once fingerprinter 202 and address mapper 204 have completed their respective processing, the results are combined. In this particular example, address mapper 204 combines the results and determines if the system has encountered new data, duplicate data, or updated data. If the write data is new, it is stored in storage 220, otherwise a reference to the already-stored data is recorded.

In various embodiments, storage 220 includes various types of storage, such as magnetic storage (e.g., hard disk drive (HDD) storage) or solid state storage (e.g., Flash storage). For clarity, storage 220 is shown as a single device but in some embodiments the storage includes a plurality or array of storage devices. For example, storage 220 may be a plurality or array of solid state storage devices. Using solid state storage devices as opposed to magnetic storage may be attractive because solid state storage has no moving parts (e.g., there is no arm that extends and retracts and no spinning disc), the power consumption may be better, and/or the size of the system may be smaller.

As described above, there is a small, but non-zero probability that two different pieces of write data result in the same fingerprint (i.e., a collision). In some embodiments, in the event a fingerprint (e.g., generated from the write data) is found in fingerprint table 206, fingerprinter 202 compares (e.g., bit-by-bit) the write data received with the data stored in storage 220 to ensure that a collision has not occurred. In contrast, some other systems may rely upon the fact that the probability of a collision is low and skip comparison of the write data and the already-stored data. In some embodiments, fingerprinter 202 (and possibly other components in deduplication storage controller 200) is implemented in hardware (e.g., an ASIC or FPGA) and thus the cost of comparing the write data and the already-stored data is relatively inexpensive.

Performing comparison of write data and stored data may be very time consuming and in some applications it may not be desirable (e.g., when a lot of data is being written and a lot of that data is duplicate data). In some embodiments, a partial or spot check is performed where only some of the write data and stored data are compared (e.g., just certain bits/bytes in the write data and stored data.). In some embodiments, an adaptive comparison technique is used where a complete comparison is used when there is no or relatively little backlog, a faster comparison is used when there is a moderate backlog (e.g., just certain bits/bytes), and the write data and stored data are not compared when there is a significant backlog. For example, the number of entries in a write data queue (not shown) between fingerprinter 202 and address mapper 204 may be compared against two thresholds in order to determine the backlog and what type of comparison (if any) to use.

The following figure describes a more detailed example of some of the processing performed by fingerprinter 202 and address mapper 204.

Figure 3:
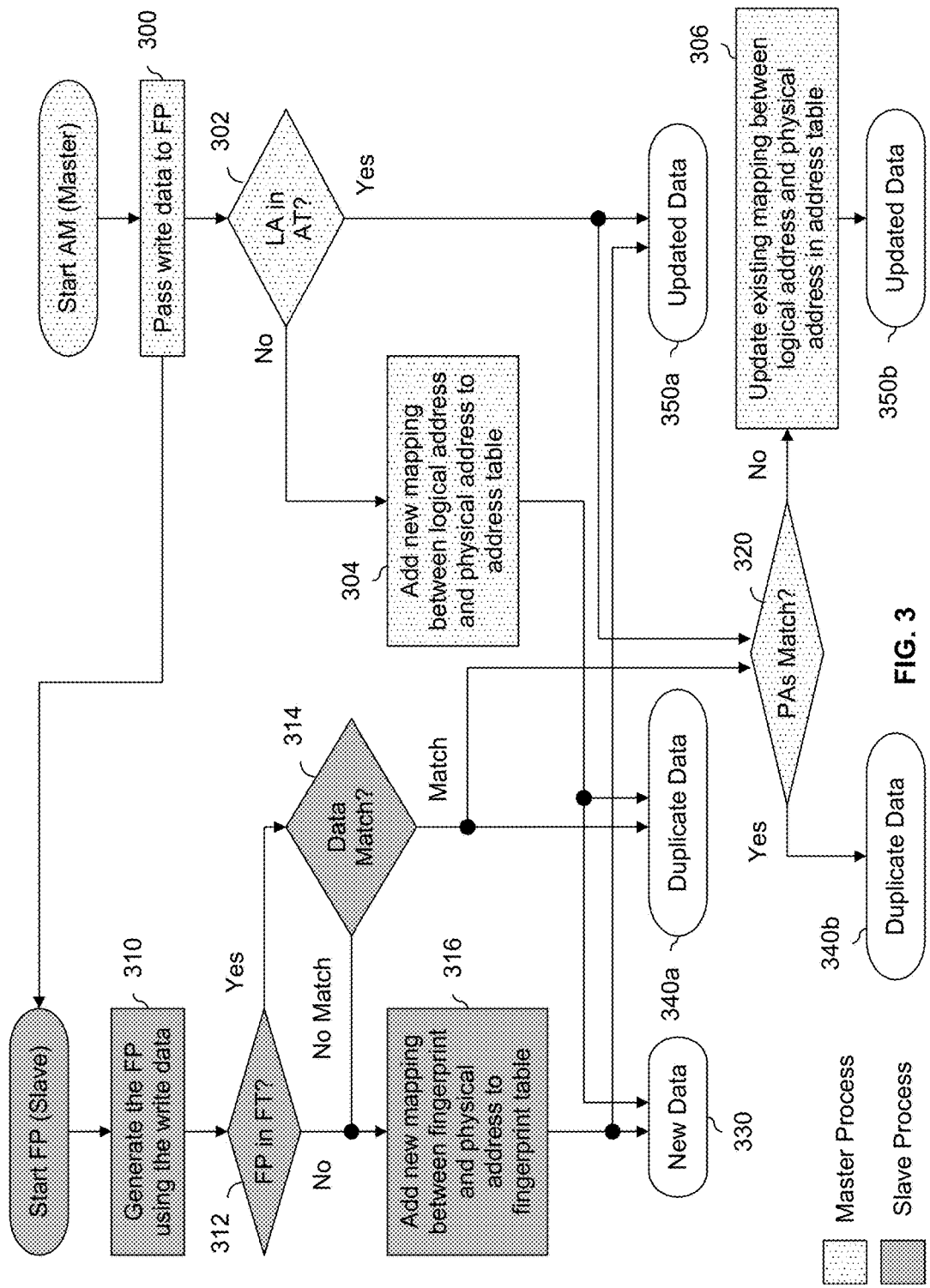
FIG. 3 is a flowchart illustrating an embodiment of a process for performing address mapping and fingerprinting using a master and a slave, respectively, in order to select a deduplication state.

FIG. 3 is a flowchart illustrating an embodiment of a process for performing address mapping and fingerprinting using a master and a slave, respectively, in order to select a deduplication state. In the example shown, the deduplication states which may be selected include: new data, duplicate data, and updated data. In some embodiments, steps 102, 104, and/or 106 in FIG. 1 are performed using steps described herein. In this example, steps performed by the master address mapper are shown with a dotted pattern and steps performed by the slave fingerprinter are shown with a shaded pattern.

The process begins with the address mapping process since it is the master. At 300, the write data is passed to the fingerprinter. As described above, it would not be desirable to delay the fingerprinter, so the write address is passed to the fingerprinter before address mapping processing begins.

At 302, it is determined if the logical address is in the address table. If the logical address is not in the address table at 302, a new mapping between the logical address and the physical address is added to the address table at 304.

The physical address which is used at 304 and (if needed) at 306 may be obtained from the address mapping process. For example, at 300, the write data may be passed from the address mapper to the fingerprinter via a write data queue. The fingerprinter may put the physical address (whether new or old) at which the write data (whether observed before or not) is located in storage in the same entry in the write data queue. The address mapper may then obtain the physical address from the write data queue and use it at 304 or 306 (if needed).

On the slave side, the fingerprinter generates the fingerprint using the write data at 310. At 312, it is determined whether the fingerprint is in the fingerprint table. If the fingerprint is found in the fingerprint table at 312, it is determined if the write data matches stored data corresponding to the fingerprint at 314. As described above, even if a given fingerprint is found in the fingerprint table, there still exists the possibility of a collision. In some embodiments, faster comparisons may be performed (e.g., only certain bits/bytes are compared) or adaptive comparison is used at 314. If the data matches at 314, the physical address corresponding to the fingerprint may be passed from the fingerprinter to the address master (e.g., via a write data queue).

If the write data and the read data do not match at 314, or if the fingerprint is not found in the fingerprint table at 312, a new mapping between the fingerprint and the physical address is added to the fingerprint table at 316. In this particular case, since the fingerprint was not found in the fingerprint table, it is known that the write data has not been seen before and thus a copy is saved in storage (e.g., as opposed to creating a reference to an already-stored copy). As such, the physical address added to the fingerprint table at 316 is a (new) physical address at which the (new) write data is stored. The (new) physical address may be passed back to the address master, for example via a write data queue or some other interface.

In systems where the storage is solid state storage, the selection of the physical address at which the new write data is stored is of particular interest. This is because program and erase (P/E) operations are both very stressful to the solid state storage. As the number of P/E cycles increases over time, the electrical insulation of the solid state storage breaks down and the storage becomes more "leaky" resulting in poor retention performance. To ensure that the end-of-life occurs as late as possible, wear leveling techniques are often used where a solid state storage controller attempts to wear out the solid state storage at an even level. In some embodiments, any new write data is passed from a fingerprinter (e.g., after determining at 312 that the fingerprint is not in the fingerprint table and thus the write data is new) to a write address selector which is configured to select a best physical address based on some wear leveling technique (e.g., select the block with the lowest P/E count). Any appropriate wear leveling technique may be used in combination with the master-slave deduplication techniques described herein.

Depending upon the results from the fingerprinter and the address master, a deduplication state is selected. New data state 330 is selected if (1) the fingerprint is not found in the fingerprint table at 312 and the logical address is not found in the address table at 302 or (2) the fingerprint is found in the fingerprint table at 312, the data does not match at 314, and the logical address is not found in the address table at 302. To put it another way, neither the logical address nor the write data have been observed before.

Duplicate data state 340a is selected if the fingerprint is found in the fingerprint table at 312, the write data and the stored data match at 314, and the logical address is not found in the address table at 302. To put it another way, the write data has been observed before (and thus there is already a copy in storage) and so the data is a duplicate (e.g., even though the logical address has not been observed before).

Updated data state 350a is selected if (1) the fingerprint is not found in the fingerprint table at 312 and the logical address is found in the address table at 302 or (2) the fingerprint is found in the fingerprint table at 312, the data does not match at 314, and the logical address is found in the address table at 302. In other words, the logical address has been observed before, but the write data has not been observed before.

Either duplicate data state 340b or updated data state 350b is selected if the fingerprint is found in the fingerprint table at 312, the read data and the write data match at 314, and the logical address is found in the address table at 302. There are two possible scenarios here: the write data and logical address were both observed before, but in different pairings with a different logical address and different data, or this specific write data and logical address pair has been observed before. The comparison of physical addresses (i.e., the comparison of the physical address corresponding to the received logical address in the address table against the physical address corresponding to the fingerprint (generated from the received write data) in the fingerprint table) at 320 differentiates between these two situation.

If the physical addresses match at 320, then duplicate data state 340b state is selected. This corresponds to the situation where that specific logical address and write data pair has been observed before. If the physical addresses do not match at 320, then an existing mapping between the logical address and the physical address is updated in the address table at 306, and updated data state 350b is selected. This corresponds to the scenario where that specific logical address and write data pair has not been observed before.

It is noted that the ordering of steps shown herein is merely exemplary so that the process can end in the selection of a deduplication state. In some embodiments, a process may need to wait until the other process (e.g., the fingerprinting process or the address mapping process) concludes, or until a deduplication state has been selected. For example, step 306 may need to wait until the physical address comparison at 320 has been performed. If the decision at 320 is Yes, then the address table does not need to be updated since that particular logical-to-physical mapping is already stored in the address table. If, however, the physical addresses do not match at 320, then the address table needs to be updated at 306 with the new logical-to-physical pair. Similarly, step 304 may need to wait until the fingerprint process concludes and a physical address is returned to the address mapper from the fingerprinter.

For simplicity, this example describes a 1-to-1 mapping between physical addresses and logical addresses in the address table and a 1-to-1 mapping between fingerprints and physical addresses in the fingerprint table. Naturally, the technique is not so limited and other embodiments can include mappings of n to m, where n and m may be any positive integer.

In order to more clearly illustrate the process of FIG. 3, an example follows where exemplary logical addresses and exemplary write data are received.

Figure 4:
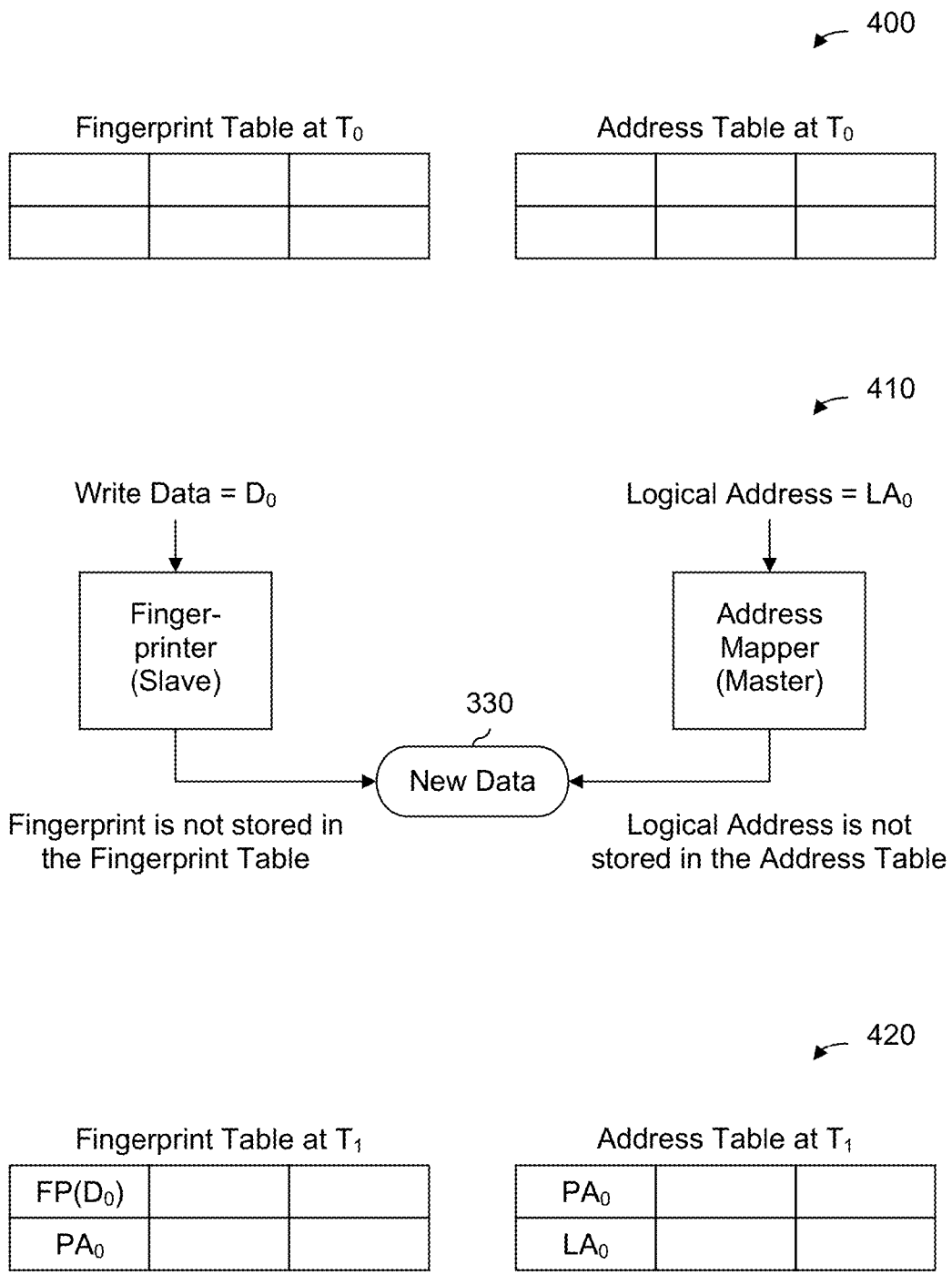
FIG. 4 is a diagram illustrating an embodiment of a fingerprint table and an address table updated in response to receiving a first logical address and write data pair.

FIG. 4 is a diagram illustrating an embodiment of a fingerprint table and an address table updated in response to receiving a first logical address and write data pair. In the example shown, diagram 400 shows an empty fingerprint table and an empty address table at a first point in time ($T_0$).

Diagram 410 shows a first logical address and a first write data ($LA_0$ and $D_0$, respectively) received by the system. (For simplicity, the write data is shown going directly to the fingerprinter, as opposed to first going to the address mapper and then to the fingerprinter. This representation is repeated in the following figures.) The fingerprinter determines if the fingerprint is stored in the fingerprint table. If so, the fingerprinter does a comparison (e.g., complete, partial, and/or adaptive depending upon the workload) of the write data received and the already-stored data to ensure there is no collision. In parallel, the address mapper determines if the logical address is not stored in the address table.

In this particular case, the fingerprinter determines that the fingerprint is not stored in the fingerprint table and the address mapper determines that the logical address is not stored in the address table. As a result, new data state (330) is selected as the deduplication state. In order to more clearly show the relationship between this example and FIG. 3, the reference numbers for the deduplication states in FIG. 3 are used in this and other figures below.

Diagram 420 shows the fingerprint table and address table at a second point in time ($T_1$), after being updated. A mapping between the fingerprint $FP(D_0)$ and the physical address $PA_0$ has been added to the fingerprint table, and a mapping between the physical address $PA_0$ and the logical address $LA_0$ has been added to the address table. Physical address $PA_0$ is the physical address at which the write data $D_0$ is stored in storage (not shown). Because neither the write data nor the logical address has been observed before, entries are added to both the fingerprint table and the address table.

FIG. 5 is a diagram illustrating an embodiment of a fingerprint table and an address table updated in response to receiving a second logical address and write data pair. FIG. 5 continues the example of FIG. 4 and diagram 500 shows the state of the fingerprint table and address table at time $T_1$.

In diagram 510, an address-data pair of $LA_1$ and $D_0$ is received. After generating the fingerprint from the write data and accessing the fingerprint table, the fingerprinter determines that that fingerprint (i.e., $FP(D_0)$) is already stored in the fingerprint table and the write data matches the stored data (i.e., it is not a collision). The address mapper determines (in parallel) that the logical address ($LA_1$) is not stored in the address table. As a result, duplicate data state 340a is selected. As is shown in this example, the duplicate data state includes the scenario where the write data has been observed before, but the logical address is new and has not been observed before.

Diagram 520 shows the updated fingerprint table and address table at time $T_2$. As is shown in this example, the fingerprint table is not updated since the write data (i.e., $D_0$) is the same and thus another fingerprint does not need to be stored and tracked. However, an entry is added to the address table in diagram 520 to associate logical address $LA_1$ with physical address $PA_0$. As the address table shows, both $LA_0$ and $LA_1$ are associated with the same physical address, and so only a single copy of the data $D_0$ is actually stored in storage (not shown).

FIG. 6 is a diagram illustrating an embodiment of a fingerprint table and an address table updated in response to receiving a third logical address and write data pair. FIG. 6 continues the example of FIG. 5. In the example shown, diagram 600 shows the fingerprint table and address table at time T2.

Write data $D_1$ and logical address $LA_0$ are received in diagram 610. The fingerprinter determines that the fingerprint generated from write data $D_1$ is not stored in the fingerprint table, and the address mapper determines that logical address $LA_0$ is already stored in the address table. As a result of these decisions or conclusions, updated data state 350a is selected.

Diagram 620 shows the fingerprint table and address table at time $T_3$ after being updated. Since the write data is new, a new entry is added to the fingerprint table where the fingerprint $FP(D_1)$ is associated with the physical address $PA_1$ (i.e., the physical address at which the write data $D_1$ is stored in storage). In the address table, the entry which includes logical address $LA_0$ is updated to reflect the physical address PA1 (corresponding to the new write data $D_1$) as opposed to physical address $PA_0$ (corresponding to the old write data $D_0$).

FIG. 7 is a diagram illustrating an embodiment of an updated fingerprint table and address table in response to receiving a fourth logical address and write data pair. FIG. 7 continues the example of FIG. 6. Diagram 700 shows the fingerprint table and address table at time $T_3$.

Diagram 710 shows the address-data pair of $LA_0$ and $D_1$ being received. The fingerprinter determines that the fingerprint generated from write data $D_1$ is already stored in the fingerprint table and that the received write data matches the data stored in storage. The address mapper determines that the logical address $LA_0$ is already stored in the address table. A comparison of the physical addresses from the relevant entries in the fingerprint table and address table at 320 reveals that the physical addresses match, and thus duplicate data state 340b is selected. Note that duplicate data state 340a (see, e.g., FIG. 5) corresponds to the case where the write data has been observed before, but the logical address has not been observed before. In contrast, duplicate data state 340b corresponds to the case where the write data and the logical address have been observed before, together (i.e., as a pair). In this particular case, the previous address-data pair received in FIG. 6 is the same address-data pair of $LA_0$ and $D_1$ as was received here. Diagram 720 shows the fingerprint table and address table at time $T_4$.

Figure 8:
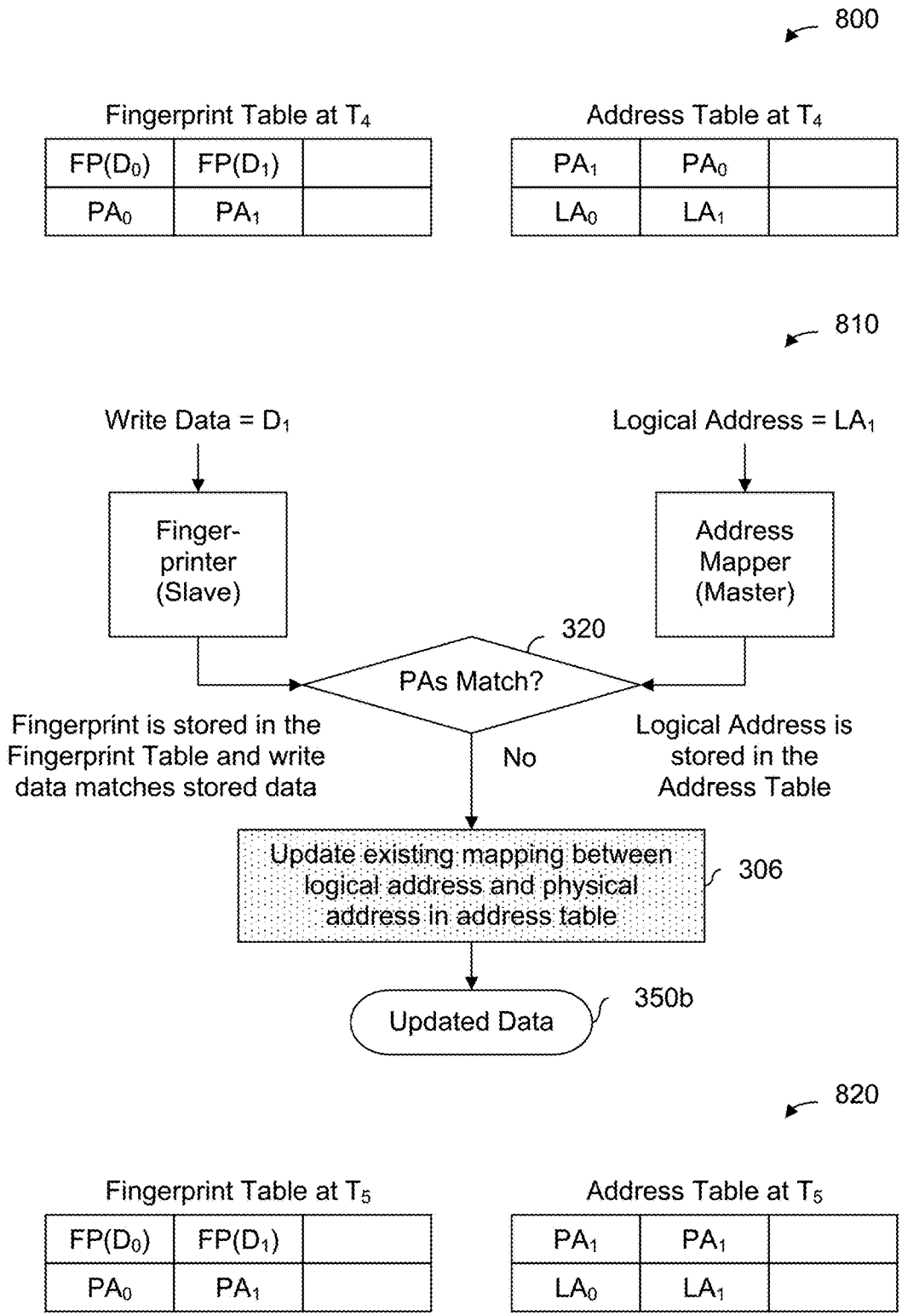
FIG. 8 is a diagram illustrating an embodiment of an updated fingerprint table and address table in response to receiving a fifth logical address and write data pair.

FIG. 8 is a diagram illustrating an embodiment of an updated fingerprint table and address table in response to receiving a fifth logical address and write data pair. FIG. 8 continues the example of FIG. 7. Diagram 800 shows the fingerprint table and address table at time $T_4$.

In diagram 810, write data $D_1$ and logical address $LA_1$ are received. The fingerprinter determines that the fingerprint corresponding to write data $D_1$ is already stored in the fingerprint table and that the received write data matches the stored data (i.e., there is no collision). The address mapper determines that the logical address is stored in the address table. At 320, the physical address from the relevant entries in the address table and fingerprint table are compared and do not match. Note, for example, that fingerprint FP(D1) corresponds to a physical address of $PA_1$ and logical address $LA_1$ corresponds to physical address of $PA_0$ in diagram 800. As such, an existing mapping between the logical address and the physical address is updated in the address table at 306, and updated data state 350b is selected. In this particular updated data scenario, both the write data and the logical address have been observed before, just not with each other. In contrast, updated data state 350a (see, e.g., FIG. 6) corresponds to the scenario where the write data has not been observed before, but the logical address has been observed before.

Diagram 820 shows the fingerprint table and address table at time $T_5$, after being updated. In this particular case, the fingerprint table remains the same. The address table, however, is updated so that the entry with a logical address of $LA_1$ is now associated with a physical address of $PA_1$ (at which the write data $D_1$ is stored on storage).

As described above, in some embodiments, a write data queue is used to exchange information between the address mapper master and the fingerprinter slave. The following figure shows an example of such a write data queue.

Figure 9:
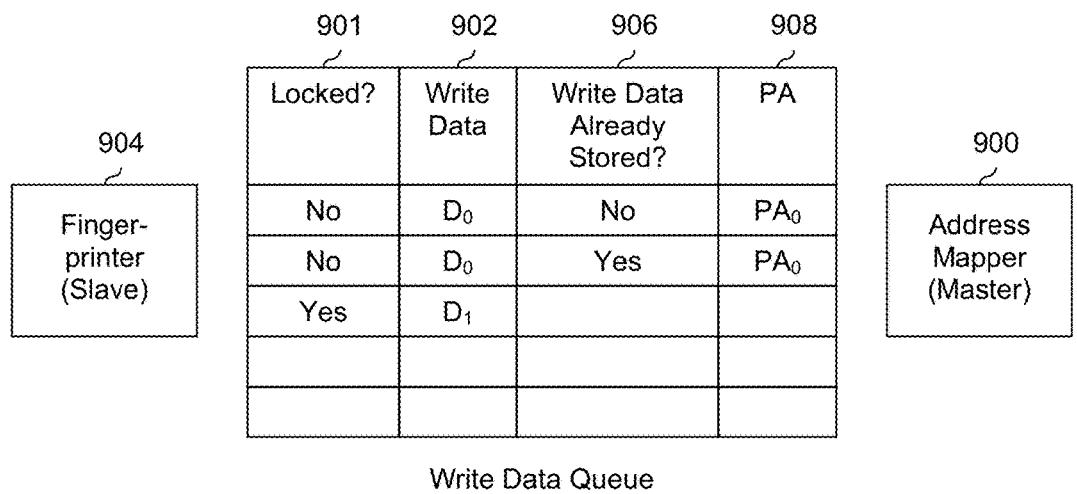
FIG. 9 is a diagram illustrating an embodiment of a write data queue.

FIG. 9 is a diagram illustrating an embodiment of a write data queue. In this example, the examples of FIGS. 4-6 are shown. Address mapper 900 enters write data into write data column 902 of the write data queue. Fingerprinter 904 becomes aware that write data has been written to the write data queue. In some embodiments, fingerprinter 904 periodically checks the write data queue for new write data; alternatively, address mapper 900 may signal directly to fingerprinter 904 that there is new write data in the write data queue.

Fingerprinter 904 accesses the write data in write data column 902 corresponding to the highest priority entry (e.g., the first entry) and generates a fingerprint from the write data. Fingerprinter 904 then (after the appropriate processing) writes in column 906 whether the write data is already stored in the system (i.e., the fingerprint was found in the fingerprint table and the received write data matched the stored data, meaning that there is no collision) and writes the corresponding physical address in physical address column 908.

In the case of the first entry and second entry, address mapper 900 uses the physical address exchanged through the write data queue to add new entries to the address table. See, for example, FIGS. 4 and 5. In the case of the third entry, address mapper 900 uses the physical address exchanged through the write data queue to update an existing entry in the address table.

Using a write data queue is desirable for a number of reasons. For one thing, address mapper 900 can queue up processes even if fingerprinter 904 is busy. For another thing, address mapper 900 can adjust the order or priority of write data if the write data has not yet been accessed by fingerprinter 904. In some embodiments, locked column 901 is used by fingerprinter 904 to indicate if it has accessed the write data stored therein and is currently processing it. For example, in the state shown, the third entry is locked because the fingerprinter is working on that write data. Note that the results have not yet been returned to column 906 and column 908 for that entry yet.

If an entry is locked (as is the case for the third entry), then that entry is not eligible to be reordered by the address mapper (e.g., if there is higher priority write data that the address mapper would like processed first). The fingerprinter may, for example, be expecting to return the results to a particular entry or row, and changing the order of entries (e.g., by inserting other entries above the entry being processed) may cause information to be returned to the wrong entry. If, however, the lock is not enabled for that entry, then one or more new entries may be inserted above that entry with other write data, or some other change to the sequence of write data awaiting processing in the write data queue may be made. This enables the address mapper 900 to reorder the sequence or priority in which write data is processed. An example of how the ability to reorder the order in which write data is processed is beneficial is described after the following figure.

For example, suppose an update comes in where the logical address has been seen before but the fingerprint and corresponding write data has changed for that logical address. For the case where the old data being replaced is only referred to by that logical address, the system would normally remove the fingerprint from the fingerprint table and the old write data would be removed from the storage itself. Further suppose that there is a subsequent write instruction with that now-deleted fingerprint and write data. If so, the fingerprint would be added back to the fingerprint table, and on the storage itself the write data would be added back. This is inefficient and costly for solid state storage since writes wear out the electrical insulation of solid state storage.

In some embodiments, the writes instructions are reordered in a write queue so that the later write instruction is processed before the update write instruction. Naturally, this assumes that this reordering will not corrupt the stored data and the proper data can be returned to the host. Such a reordering would prevent the unnecessary deletion and addition described above from the fingerprint table and the storage itself. Such a reordering may also reduce the amount of time required to scan address table (e.g., when the update instruction is received). This is because if there is no other reference to fingerprint or write data (which would have been deleted if not for the reordering), the process would have to go all the way though in the address table in order to conclusively determine that the fingerprint and write data in question can be deleted.

The following figure describes an embodiment of an obsolete physical address queue. This queue is used by the address mapper to signal to the fingerprinter which physical addresses are obsolete and thus which entries in the fingerprint table can be deleted.

Figure 10:
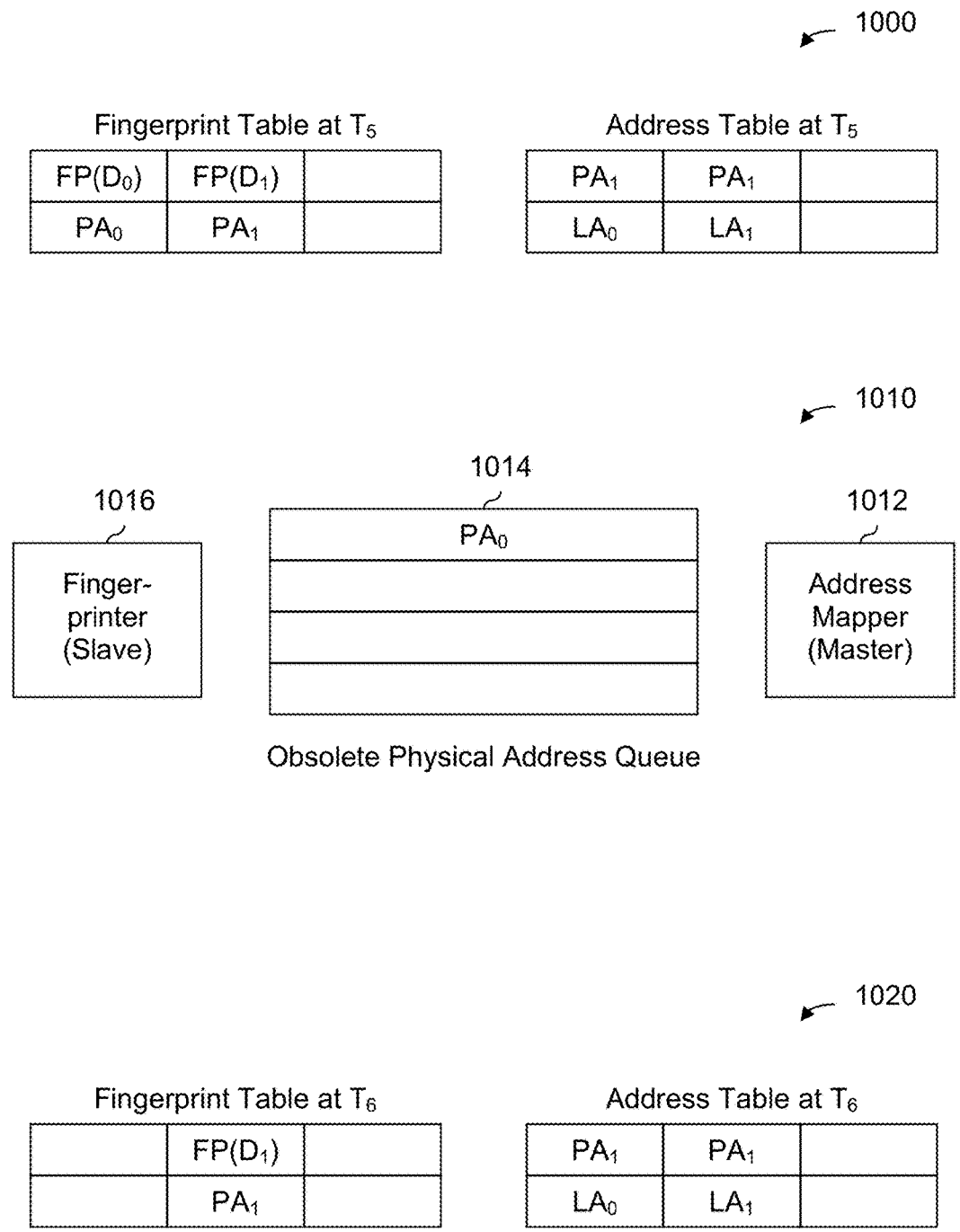
FIG. 10 is a diagram illustrating an embodiment of an obsolete physical address queue.

FIG. 10 is a diagram illustrating an embodiment of an obsolete physical address queue. Diagram 1000 shows a fingerprint table and an address table at time $T_5$ and continues the example of FIG. 8. In the address table, none of the entries include physical address $PA_0$. This means that none of the logical addresses reference the data stored at physical address $PA_0$, and thus an entry that includes that physical address can be deleted from the fingerprint table.

To indicate this, the address mapper (1012) puts the obsolete physical address $PA_0$ into the obsolete physical address queue (1014) in diagram 1010. In some embodiments, the address mapper tracks all physical addresses in the address table and when the number of references to a particular physical address reaches 0 (e.g., the checker reaches the end of the address table without finding a reference to that physical address), that physical address is added to the obsolete physical address queue.

Diagram 1020 shows the fingerprint table at time $T_6$ with the entry containing physical address $PA_0$ deleted. The fingerprinter (1016) may then remove the address from the obsolete physical address queue (not shown), freeing up that entry for another address.

In various embodiments, the fingerprinter may process the addresses in the obsolete physical address queue at any desired time. For example, the fingerprinter may go through the obsolete physical address queue when space is needed in the fingerprint table, or when the fingerprinter is not actively processing some write data, etc. Using a queue to convey the obsolete physical addresses to the fingerprinter may be desirable because it permits the fingerprinter to process the obsolete physical addresses at a time that is convenient and/or desirable for the fingerprinter. The address mapper can also queue up obsolete physical addresses even if the fingerprinter is busy.

Figure 11:
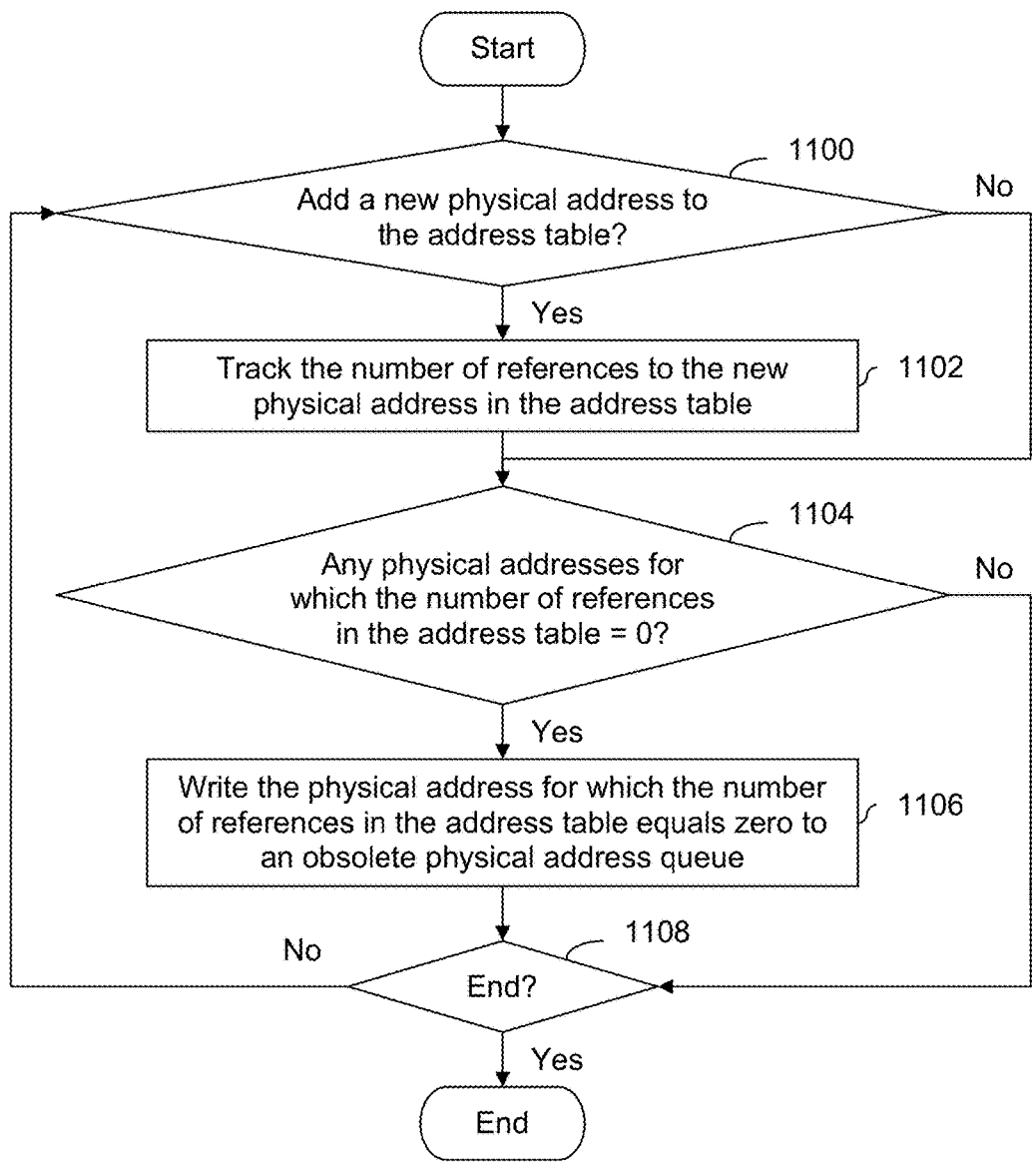
FIG. 11 is a flowchart illustrating an embodiment of a process of identifying obsolete physical addresses.

FIG. 11 is a flowchart illustrating an embodiment of a process of identifying obsolete physical addresses. For example, address mapper 1012 in FIG. 10 may perform this process on the address table (e.g., shown in diagram 1000) to identify obsolete physical addresses to put into obsolete physical address queue 1014.

At 1100, it is determined if a new physical address has been added to the address table. For example, FIG. 4 shows one example where this decision would be "Yes" and FIG. 5 shows one example where this decision would be "No" (e.g., since the physical address added to the address table in FIG. 5 has been observed before and is thus not new).

If a new physical address is added at 1100, then the number of references to the new physical address in the address table is tracked at 1102. For example, in FIG. 4 at time $T_1$, the count for $PA_0$ would be 1 and in FIG. 5 at time $T_2$, the count for $PA_0$ would be 2. Tracking at 1102 may be an on-going and/or background process that periodically checks the number of references to each physical address.

After tracking at 1102 or if no new physical address was added at 1100, it is determined if there are any physical addresses for which the number of references in the address table equals zero. If so, the physical address for which the number of references in the address table equals zero is written to an obsolete physical address queue at 1106. See, for example, diagrams 1000 and 1010 in FIG. 10.

After writing to the obsolete physical address queue at 1106 or if there are no physical addresses for which the number of references in the address table equals zero at 1104, it is determined at 1108 whether to end the process. In some embodiments, the process may run continuously.

Figure 12:
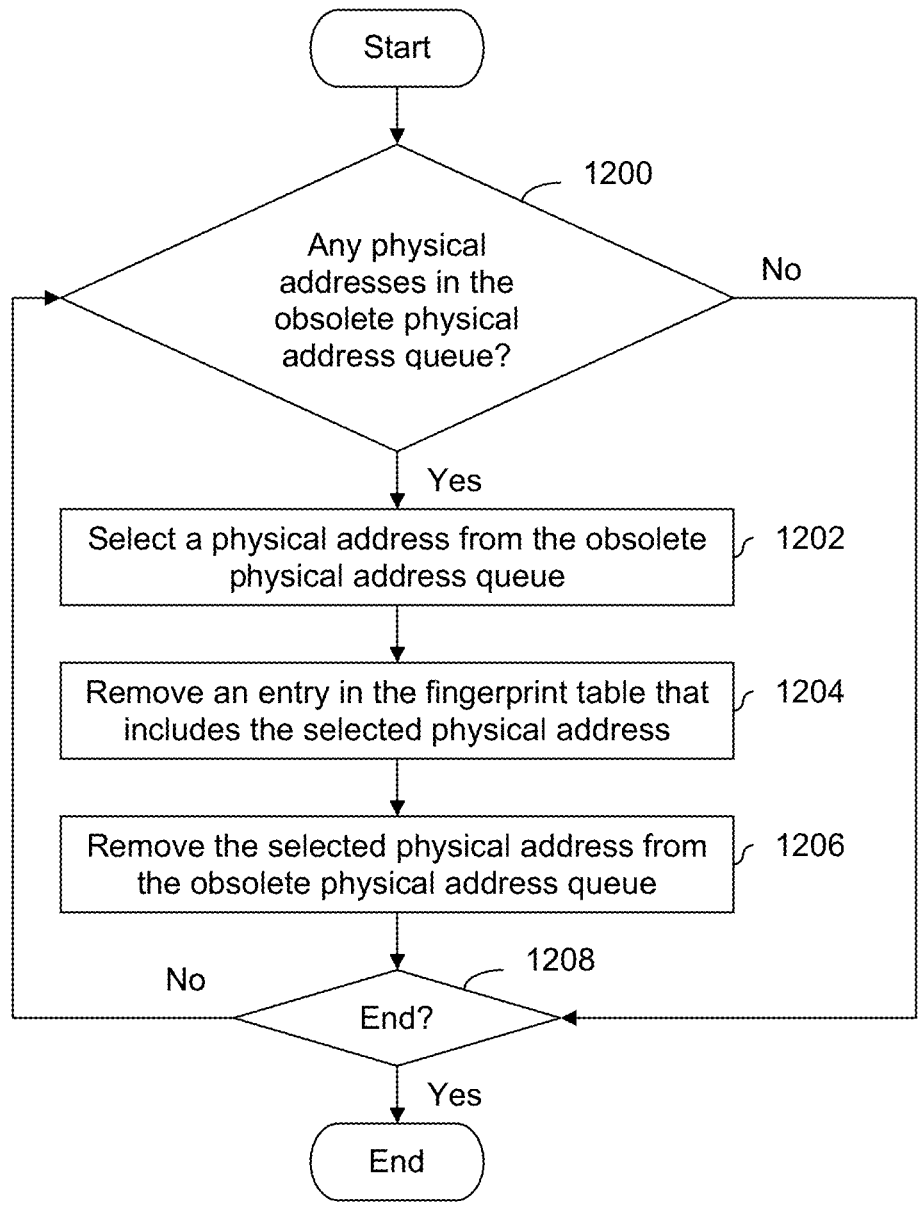
FIG. 12 is a flowchart illustrating an embodiment of a process for updating a fingerprint table using an obsolete physical address queue.

FIG. 12 is a flowchart illustrating an embodiment of a process for updating a fingerprint table using an obsolete physical address queue. For example, the process may be performed by fingerprinter 1016 in FIG. 10.

At 1200, it is determined if there are any physical addresses in the obsolete physical address queue. As described above, in various embodiments, the fingerprinter may check or otherwise service the obsolete physical address queue when it needs to free up space in the fingerprint table, when it is not processing write data for the address mapper master, etc.

If there are physical addresses in the obsolete physical address queue at 1200, then a physical address is selected from the obsolete physical address queue at 1202. At 1204, an entry in the fingerprint table that includes the selected physical address is removed. Compare, for example, the fingerprint table in diagram 1000 in FIG. 10 against that in diagram 1020 where the entry with the physical address $PA_0$ has been removed.

At 1206, the selected physical address is removed from the obsolete physical address queue. This, for example, lets the address mapper know that the fingerprinter has removed that physical address from the fingerprint table. It also frees up that entry for another obsolete physical address.

After step 1206 or if the obsolete physical address queue is empty at 1200, it is determined whether to end the process at 1208. In some embodiments, the process runs continuously.

In some embodiments, deduplication storage comprises solid state storage, such as NAND Flash. Solid state storage has some characteristics and operations that other types of storage (such as hard disk drive storage) do not have. The following describes an embodiment of a master-slave deduplication storage system which is able to work with some of the idiosyncrasies of solid state storage.

Figure 13:
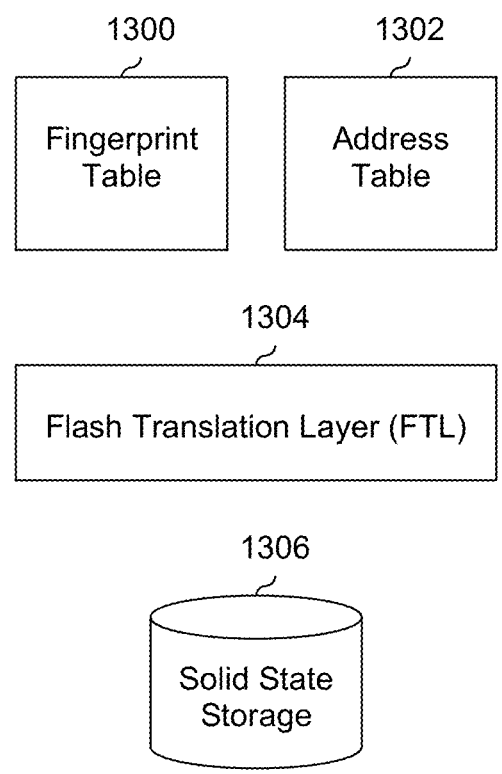
FIG. 13 is a diagram illustrating an embodiment of a solid state storage system which includes a flash translation layer (FTL).

FIG. 13 is a diagram illustrating an embodiment of a solid state storage system which includes a flash translation layer (FTL). In the example shown, storage 1306 comprises solid state storage, such as NAND Flash. Although storage 1306 is shown as a single device, in some embodiments, solid state storage 1306 comprises multiple storage devices.

Solid state storage, unlike other types of storage such as magnetic storage, have background processes which move the data from one physical location on solid state storage 1306 without changing the logical address and/or without the host being aware of it. Some examples of background processes which may move data include garbage collection (e.g., because solid state storage cannot do in-place update) or a refresh process that copies data that has been stored for a long time to a new location (e.g., because with usage, the electrical insulation of solid state storage breaks down, making the device "leaky" with respect to stored charge).

In the example shown, fingerprint table 1300 and address table 1302 reside above flash translation layer 1304. Flash translation layer 1304 may include some mapping between addresses that are input to it (e.g., the physical addresses stored by fingerprint table 1300 and/or address table 1302) to the actual physical locations on solid state storage 1306 that correspond to those input locations. To put it another way, the physical addresses stored by fingerprint table 1300 and/or address table 1302 may not correspond to the actual physical locations on solid state storage 1306 on which some information is stored.

Such an arrangement may be attractive for a variety of reasons. In some systems, the FTL has already been implemented and it is desirable to pass all access requests through FTL 1304 since background processes such as garbage collection and/or refresh processes know to update mappings stored in the FTL when moving data from one location to another on solid state storage 1306. It may also be desirable to have fingerprint table 1300 and address table 1302 above FTL 1304 because those tables do not need to be locked when background processes such as garbage collection and/or refresh are being performed. Locking those tables would cause the deduplication process to halt when a background process is running, which is undesirable.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, including a processor, and coupled to the memory device, containing instructions executed by the processor, comprising:
    an address mapping master configured to:
    receive a write instruction, including: (1) a logical address and (2) write data to be stored at the logical address;
    determine if the logical address is stored in an address table that includes one or more mappings between one or more logical addresses and a physical address; and
    select a deduplication state based at least in part on: (1) whether the logical address is stored in the address table and (2) whether a fingerprint is stored in a fingerprint table, wherein the fingerprint table includes one or more mappings between a fingerprint and a physical address; and
    a fingerprinting slave configured to:
    generate the fingerprint using the write data; and
    determine if the fingerprint is stored in the fingerprint table, wherein: (1) the address mapping master and the fingerprinting slave are configured to run in parallel and (2) the address mapping master is the master to the fingerprinting slave.

2. The system of claim 1, wherein the system includes a semiconductor device, including one or more of the following: an application-specific integrated circuit (ASIC) or a field-programmable gate array (FPGA).

3. The system of claim 1, wherein when the fingerprint is stored in the fingerprint table, the fingerprinting slave is further configured to determine if the write data matches stored data corresponding to the fingerprint.

4. The system of claim 3, when the write data matches the stored data, the address mapping master is further configured to:
    when the logical address is not stored in the address table, select duplicate data as the deduplication state; and
    when the logical address is stored in the address table:
    determine if a first physical address, stored in the address table and corresponding to the logical address, matches a second physical address, stored in the fingerprint table and corresponding to the fingerprint;
    when the first and the second physical addresses match, select duplicate data as the deduplication state; and
    when the first and the second physical addresses do not match, select updated data as the deduplication state.

5. The system of claim 3, wherein when the write data does not match stored data, the address mapping master is further configured to:
    when the logical address is not stored in the address table, select new data as the deduplication state; and
    when the logical address is stored in the address table, select updated data as the deduplication state.

6. The system of claim 1 further comprising a write data queue, wherein:

the address mapping master is further configured to write the write data to the write data queue; and the fingerprinting slave is further configured to obtain the write data from the write data queue.

7. The system of claim 1 further comprising an obsolete physical address queue, wherein:

the address mapping master is further configured to write physical addresses for which a number of references in the address table equals zero to the obsolete physical address queue; and the fingerprinting slave is further configured to remove entries in the fingerprint table that include physical addresses from the obsolete physical address queue.

8. A method, comprising:

receiving a write instruction, including: (1) a logical address and (2) write data to be stored at the logical address;

using an address mapping master to determine if the logical address is stored in an address table that includes one or more mappings between one or more logical addresses and a physical address;

selecting a deduplication state based at least in part on: (1) whether the logical address is stored in the address table and (2) whether a fingerprint is stored in a fingerprint table, wherein the fingerprint table includes one or more mappings between a fingerprint and a physical address;

generating the fingerprint using the write data; and using a fingerprinting slave to determine if the fingerprint is stored in the fingerprint table, wherein: (1) the address mapping master and the fingerprinting slave are configured to run in parallel and (2) the address mapping master is the master to the fingerprinting slave.

9. The method of claim 8, wherein the address mapping master and the fingerprinting slave are implemented on a semiconductor device, including one or more of the following: an application-specific integrated circuit (ASIC) or a field-programmable gate array (FPGA).

10. The method of claim 8, wherein when the fingerprint is stored in the fingerprint table, the method further includes using the fingerprinting slave to determine if the write data matches stored data corresponding to the fingerprint.

11. The method of claim 10, wherein when the write data matches the stored data, the method further includes using the address mapping master to:

when the logical address is not stored in the address table, select duplicate data as the deduplication state; and when the logical address is stored in the address table:

determine if a first physical address, stored in the address table and corresponding to the logical address, matches a second physical address, stored in the fingerprint table and corresponding to the fingerprint;

when the first and the second physical addresses match, select duplicate data as the deduplication state; and when the first and the second physical addresses do not match, select updated data as the deduplication state.

12. The method of claim 10, wherein when the write data does not match stored data, the method further includes using the address mapping master to:

when the logical address is not stored in the address table, select new data as the deduplication state; and when the logical address is stored in the address table, select updated data as the deduplication state.

13. The method of claim 8, further comprising:

using the address mapping master to write the write data to a write data queue; and using the fingerprinting slave to obtain the write data from the write data queue.

14. The method of claim 8, further comprising:

using the address mapping master to write physical addresses for which a number of references in the address table equals zero to the obsolete physical address queue; and using the fingerprinting slave to remove entries in the fingerprint table that include physical addresses from the obsolete physical address queue.

15. A computer program product, the computer program product being embodied in a non-transitory computer readable storage medium and comprising computer instructions for:

receiving a write instruction, including: (1) a logical address and (2) write data to be stored at the logical address;

using an address mapping master to determine if the logical address is stored in an address table that includes one or more mappings between one or more logical addresses and a physical address;

selecting a deduplication state based at least in part on: (1) whether the logical address is stored in the address table and (2) whether a fingerprint is stored in a fingerprint table, wherein the fingerprint table includes one or more mappings between a fingerprint and a physical address;

generating the fingerprint using the write data; and using a fingerprinting slave to determine if the fingerprint is stored in the fingerprint table, wherein: (1) the address mapping master and the fingerprinting slave are configured to run in parallel and (2) the address mapping master is the master to the fingerprinting slave.

16. The computer program product of claim 15, wherein when the fingerprint is stored in the fingerprint table, the method further includes using the fingerprinting slave to determine if the write data matches stored data corresponding to the fingerprint.

17. The computer program product of claim 15, further comprising:

using the address mapping master to write the write data to a write data queue; and using the fingerprinting slave to obtain the write data from the write data queue.

18. The computer program product of claim 15, further comprising:

using the address mapping master to write physical addresses for which a number of references in the address table equals zero to the obsolete physical address queue; and using the fingerprinting slave to remove entries in the fingerprint table that include physical addresses from the obsolete physical address queue.

* * * * *